（12) United States Patent
Sato et al.

(10) Patent No.: US 9,455,491 B2
(45) Date of Patent: *Sep. 27, 2016

(54) WIRELESS DEVICE

(71) Applicant: KABUSHIKI KAISHA TOSHIBA, Minato-ku, Tokyo (JP)

(72) Inventors: Koichi Sato, Tachikawa (JP); Makoto Tabata, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 59 days.

This patent is subject to a terminal disclaimer.

(21) Appl. No.: 14/488,687

(22) Filed: Sep. 17, 2014

(65) Prior Publication Data

US 2015/0005045 A1    Jan. 1, 2015

Related U.S. Application Data

(63) Continuation of application No. 13/654,145, filed on Oct. 17, 2012, now Pat. No. 9,088,070, which is a continuation of application No. 12/556,766, filed on Sep. 10, 2009, now abandoned.

(30) Foreign Application Priority Data

Mar. 30, 2009    (JP) .................................. 2009-082341

(51) Int. Cl.
*G06F 3/041*    (2006.01)
*H01Q 1/24*    (2006.01)
*G06F 1/16*    (2006.01)
(Continued)

(52) U.S. Cl.
CPC ............ *H01Q 1/243* (2013.01); *G06F 1/1626* (2013.01); *G06F 1/1698* (2013.01); *H01Q 9/0421* (2013.01); *H01Q 9/30* (2013.01); *H01Q 9/42* (2013.01); *H01Q 21/28* (2013.01)

(58) Field of Classification Search
None
See application file for complete search history.

(56) References Cited

U.S. PATENT DOCUMENTS 6,686,886 B2    2/2004    Flint et al.
7,541,987 B2    6/2009    Kyou et al.
(Continued)

FOREIGN PATENT DOCUMENTS

CN    1770551 A    5/2006
CN    101127414 A    2/2008
(Continued)

OTHER PUBLICATIONS

Advisory Action dated May 7, 2014, issued in parent U.S. Appl. No. 13/654,145.
(Continued)

*Primary Examiner* — Christopher R Lamb
(74) *Attorney, Agent, or Firm* — Holtz, Holtz & Volek PC

(57) ABSTRACT

A wireless device includes: a casing having a first face; a display configured to be visible from the first face; a touch sensor formed by a transparent material and mounted in the casing with respect to the display as a part of the first face; a substrate mounted to a side opposite to the first face with respect to the display; and an antenna element including: a first portion built in the casing, connected to a feeding point included in the substrate, and located within a first range occupied by the touch sensor when viewed from a direction perpendicular to the first face; and a second portion located within a second range other than the first range.

20 Claims, 6 Drawing Sheets

(51) Int. Cl.
  *H01Q 9/04* (2006.01)
  *H01Q 9/30* (2006.01)
  *H01Q 9/42* (2006.01)
  *H01Q 21/28* (2006.01)

(56) References Cited

U.S. PATENT DOCUMENTS

| | | | |
|---|---|---|---|
| 7,961,150 | B2 | 6/2011 | Kyou et al. |
| 2002/0061775 | A1 | 5/2002 | Iwai et al. |
| 2003/0114120 | A1 | 6/2003 | Kwong et al. |
| 2003/0222823 | A1 | 12/2003 | Flint et al. |
| 2004/0183788 | A1 | 9/2004 | Kurashima et al. |
| 2004/0257283 | A1 | 12/2004 | Asano et al. |
| 2007/0222688 | A1 | 9/2007 | Sugiyama |
| 2008/0018543 | A1 | 1/2008 | Baliarda et al. |
| 2008/0316121 | A1 | 12/2008 | Hobson et al. |

FOREIGN PATENT DOCUMENTS

| | | |
|---|---|---|
| EP | 1 653 325 A1 | 5/2006 |
| JP | 2004-040596 A | 2/2004 |
| JP | 2005-507185 A | 3/2005 |
| JP | 2006-048166 A | 2/2006 |
| JP | 2006-50586 A | 2/2006 |

OTHER PUBLICATIONS

Non-Final Office Action dated Jun. 9, 2014, issued in parent U.S. Appl. No. 13/654,145.

Final Office Action dated Dec. 3, 2014, issued in parent U.S. Appl. No. 13/654,145.

Japanese Office Action dated May 24, 2011 (and English translation thereof) issued in counterpart Japanese Application No. 2009-082341.

Extended European Search Report (EESR) dated Feb. 8, 2012 (in English) issued in counterpart European Application No. 09011670.8.

Chinese Office Action dated Jul. 3, 2012 (and English translation thereof) issued in counterpart Chinese Application No. 200910168363.5.

Advisory Action dated Feb. 24, 2015, issued in parent U.S. Appl. No. 13/654,145.

WIRELESS DEVICE

CROSS-REFERENCE TO RELATED APPLICATIONS

This is a Continuation of U.S. application Ser. No. 13/654,145, filed Oct. 17, 2012, which is a Continuation of U.S. application Ser. No. 12/556,766, filed Sep. 10, 2009, which is based on and claims the benefit of priority from Japanese Patent Application No. 2009-082341, filed Mar. 30, 2009, the entire contents of all of which are incorporated herein by reference.

BACKGROUND

1. Field of the Invention

One aspect of the invention relates to a wireless device, in particular, to a wireless device including a touch panel configured by a display device and a touch sensor.

2. Description of the Related Art

A touch panel configured by combining a touch sensor and a display device such as a liquid crystal panel is used as an operation input means for various electronic devices, for example, mobile phones, handheld terminals, copiers, portable game machines, electronic dictionaries, car navigators, electric appliances, automatic ticket vending machines, cash dispensers, etc.).

In such a touch panel, since the operation keys displayed on a screen of the display device can be set up variously and freely by the software, greater flexibility of operation input is obtained compared to a mechanical operation key.

However, any attempts to use the touch panel in small wireless devices such as mobile phones will face various challenges. In order to have multiple and diverse functions like recent mobile phones and as well as obtaining an easily visible display, it is necessary to form the screen size of the display device as large as possible. Furthermore, a circuit substrate or a battery may be housed in a space formed in the rear of the display screen. Thus, in order to arrange an antenna, which is an essential part of the wireless device, within a casing, it is necessary to utilize the limited space formed on the periphery of the casing and outside the frame of the display screen.

The peripheral portion of the casing corresponds to the periphery of the touch sensor mounted so as to cover the display screen, and in addition an electric line for signaling information regarding a detected position is mounted in the vicinity of the periphery of the casing. Thus, if such line approaches the antenna, there is concern it will have an unfavorable influence on a characteristic of the antenna (for example, a decrease of impedance, electromagnetic interference, etc.).

As a technique to address such an issue, a technique where the antenna is built in the display device including a touch panel is known (See JP-A-2006-48166, 5 and 8 pages, FIGS. 2 and 8). The touch panel of the display device disclosed in JP-A-2006-48166 has an operation unit which is a region where touch operation is able to be performed, and a frame unit formed therearound, and further includes an antenna unit in a part of the frame unit.

For the display device disclosed in JP-A-2006-48166, as shown in FIG. 8 of JP-A-2006-48166, the antenna is mounted in the frame unit of the touch panel, specifically, a position overlapped with a support substrate of the touch panel when viewed from a direction perpendicular to the display screen. Thus, disposing the entire antenna in a position overlapped with the substrate may cause unfavorable issues in the light of the characteristic of the antenna described above.

SUMMARY

One of objects of the invention is to provide a wireless device having a touch panel, capable of preventing deterioration in the characteristic of an antenna.

According to an aspect of the invention, there is provided a wireless device including: a casing having a first face; a display configured to be visible from the first face; a touch sensor formed by a transparent material and mounted in the casing with respect to the display as apart of the first face; a substrate mounted to a side opposite to the first face with respect to the display; and an antenna element including: a first portion built in the casing, connected to a feeding point included in the substrate, and located within a first range occupied by the touch sensor when viewed from a direction perpendicular to the first face; and a second portion located within a second range other than the first range.

BRIEF DESCRIPTION OF THE DRAWINGS

Embodiment may be described in detail with reference to the accompanying drawings, in which.

DETAILED DESCRIPTION OF THE EMBODIMENTS

Figure 1:
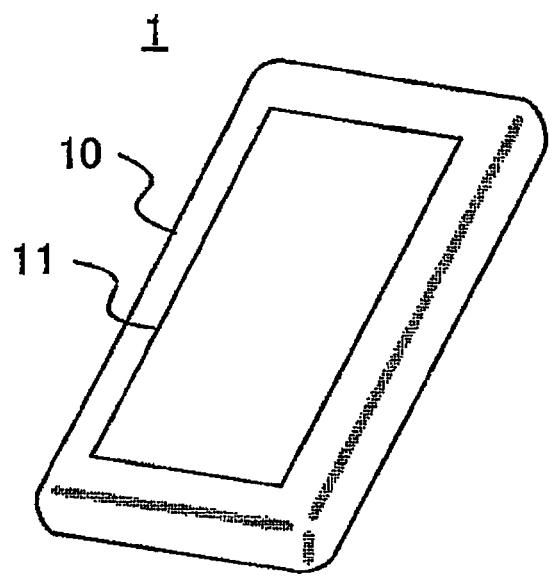
FIG. 1 is an exemplary perspective view illustrating an appearance of a wireless device related to a first embodiment of the invention.

Now, exemplary embodiments of the invention will be described with reference to accompanying drawings.

In addition, as used herein with reference to each drawing, unless otherwise noted, terms "top and bottom, left and right, or horizontal, perpendicular (vertical)" mean that these are "top and bottom, left and right, or horizontal, perpendicular (vertical)" with respect to a plane of the paper. Further, the same reference characters are used to designate the same configuration throughout the drawings.

First Embodiment

A first embodiment of the invention will be described herein below, with reference to FIG. 1 to FIG. 6. FIG. 1 is a perspective view illustrating an appearance of a wireless device 1 related to the first embodiment of the invention. The wireless device 1 includes a touch panel 11 at a front (a face facing the user during use) of the casing 10 having a rectangular shape with a thickness (the rectangular shape includes a shape similar to a rectangle with rounded corners, as shown). The touch panel 11 is configured to overlap, for example, a liquid crystal display device with a touch sensor made of a transparent material, which will be described later. The touch panel 11 is used as an operation input unit by displaying software-controlled operation keys on a screen of the display device, and used as a display unit capable of displaying various texts or images.

Figure 2:
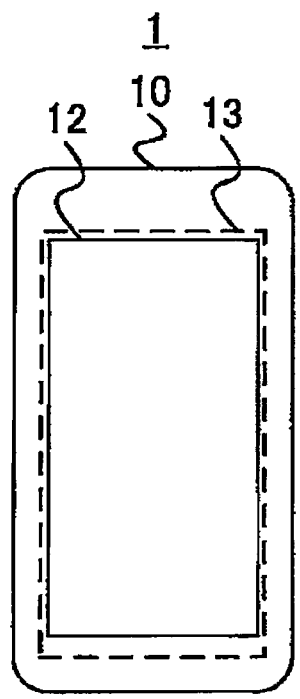
FIG. 2 is an exemplary front view illustrating a configuration of the wireless device related to the first embodiment of the invention.
Figure 3:
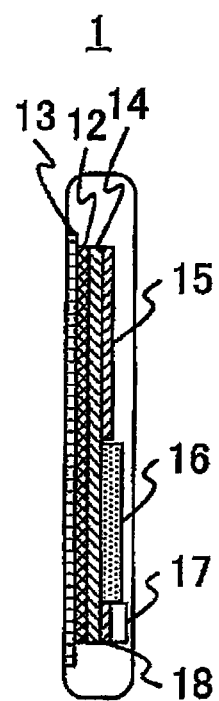
FIG. 3 is an exemplary side view illustrating the configuration of the wireless device related to the first embodiment of the invention.
Figure 4:
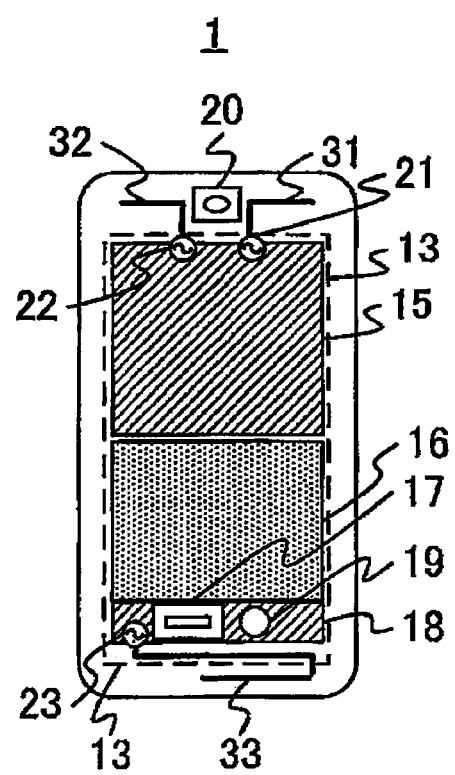
FIG. 4 is an exemplary rear view illustrating the configuration of the wireless device related to the first embodiment of the invention.

FIG. 2 is a front view illustrating main configurations of the wireless device 1 when viewed from the front (i.e., from a direction perpendicular to the front of the casing 10). FIG. 3 is a side view illustrating the main configurations of the wireless device 1 when viewed from the right side of FIG. 2. In FIG. 3, the left side and the right side respectively correspond to the front of the casing 10 and the rear side opposite to the front of the casing 10. FIG. 4 is a rear view illustrating the main configurations of the wireless device 1 viewed from the rear side of the casing 10.

As shown in FIG. 2, a display 12 including, for example a liquid crystal device is mounted so as to be visible from the front of the casing 10. Referring to FIG. 3, a touch sensor 13 is mounted at the front of the casing 10 with respect to the display 12. In FIG. 2, the touch sensor 13 is illustrated as a rectangle with a broken line. The touch sensor 13 is made of a transparent material, and as shown in FIGS. 2 and 3, is mounted to the front of the casing 10 so as to be a part of the casing 10. The touch panel 11 described with reference to FIG. 1 includes the display 12 and the touch sensor 13.

As shown in FIG. 3, a supporting member 14 for reinforcing the mechanical strength of the display 12 is mounted to the rear side of the display 12. Further, a first substrate 15, a battery 16, a speaker 17 and a second substrate 18 are mounted to the rear side of the supporting member 14 from the upside of FIG. 3 in order. Referring to FIG. 4, it is apparent that the main portion of the rear side of the casing 10 is occupied by the first substrate 15, the battery 16 and the second substrate 18. The speaker 17 and a vibrator 19 used for call alert in a manner mode are mounted to the second substrate 18.

As shown in FIG. 4, a first feeding point 21 and a second feeding point 22 are mounted in the vicinity of the center of the upper side in the first substrate 15. Each of the first feeding point 21 and the second feeding point 22 is connected to an RF circuit (not shown) loaded on the first substrate 15. As shown in FIG. 4, the third feeding point 23 is mounted in the vicinity of the left and lower end of the second substrate 18. The third feeding point 23 is connected to an RF circuit (not shown) loaded on the first substrate 15 via a connection line (not shown) (for example, a coaxial cable) connecting between the first substrate 15 and the second substrate 18. In addition, the third feeding point 23 may be connected to an RF circuit (not shown) mounted on the second substrate 18.

As shown in FIG. 4, a first antenna element 31, a second antenna element 32 and a third antenna element 33 are connected to the first feeding point 21, the second feeding point 22 and the third feeding point 23, respectively. The first antenna element 31 and the second antenna element 32 are built in the casing 10 using the upper mounting space of the casing 10 in FIG. 4. The third antenna element 33 is built in the casing 10 using the lower mounting space of the casing 10 in FIG. 4.

While a part of each antenna element related to the first embodiment has been described with reference to the side view of FIG. 3, which for simplicity does not illustrate the antenna element, the characteristics of each antenna element related to the first embodiment when viewed from the side of the casing 10 will be described later, with reference to FIG. 5. As shown in FIG. 4, the camera 20 is mounted to the upper mounting space of casing 10 at a position between the first antenna element 31 and the second antenna element 32.

As shown in FIG. 4, the third antenna element 33 is formed as an open-ended line, and, regarding voltage distribution along the line when power is fed to through the third feeding point 23, voltage with a relatively high amplitude is distributed at the open terminal (for example, an open-ended monopole antenna). In addition, current with relatively high amplitude is distributed at a power-supply terminal. In FIG. 4, as in FIG. 2, the touch sensor 13 is represented by a rectangle with a broken line.

As shown in FIG. 4, when viewed from the rear side of the casing 10 (i.e., when viewed from the direction perpendicular to the front of the casing 10; the case when viewed from the front is also the same), the power-supply terminal and the open terminal of the third antenna element 33 are respectively mounted so as to be located inside and outside of a range that the touch sensor 13 occupies.

As described above, since an electrical wiring line for transmitting detected position information is mounted in the peripheral portion of the touch sensor 13, it may lead to an unfavorable influence on the characteristics of the antenna. In particular, in a layout in which a portion where the voltage with relatively high amplitude is distributed when power is fed to the antenna is hidden by the touch sensor 13, such influence is too much. According to the first embodiment, as shown in FIG. 4, by selecting a configuration in which the open terminal of the third antenna element 33 is arranged beside a range that the touch sensor 13 occupies (i.e., not hidden by the touch sensor 13), such unfavorable influence is able to be reduced.

In addition, as shown in FIG. 4, the first antenna element 31 and the second antenna element 32 are arranged so that the open terminals are not hidden by the touch sensor 13 when viewed from a direction perpendicular to the front of the casing 10. Thus, since the influence on the first antenna element 31 and the second antenna element 32 caused by the electrical wiring line formed at a peripheral portion of the touch sensor 13 is reduced, deterioration in characteristics of the antenna is able to be suppressed.

Referring to FIG. 2 or FIG. 4, a portion located beside a range that the touch sensor 13 occupies in the casing 10 corresponds to the periphery of the casing 10 when the casing 10 is viewed from a direction perpendicular to the front of the casing 10. This is based on the fact that the ratio of the area occupied by the touch sensor 13 with respect to the front or rear area of the casing 10 is relatively large in FIG. 2 or FIG. 4. On the other hand, if the area ratio that the touch sensor 13 occupies is not so large, the visible portion beside the portion that the touch sensor 13 occupies may be not limited to the periphery of the casing 10.

Figure 5:
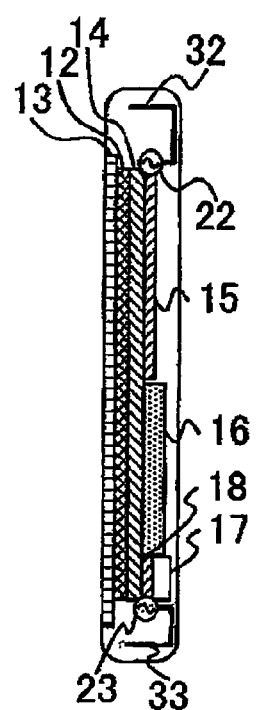
FIG. 5 is an exemplary view illustrating the wireless device of FIG. 3 on an enlarged scale, in which a second feeding point 22, a second antenna element 32, a third feeding point 23 and a third antenna element 33 are added.

FIG. 5 is a side view illustrating the wireless device 1 of FIG. 3 on an enlarged scale, in which the second feeding point 22, the second antenna element 32, the third feeding point 23 and the third antenna element 33 are added. Similarly to FIG. 3, the left side corresponds to the front of the casing 10, and the right side corresponds to the rear side of the casing 10, respectively. For simplicity, description of elements shown in FIG. 5 similar to elements shown in FIG. 3 or 4 will be omitted.

As shown in FIG. 5, a portion including a position connected to the second feeding point 22 of the second antenna element 32 is formed so as to be heading toward the rear side of the casing 10. In addition, a portion including a position connected to the third feeding point 23 of the third antenna element 33 is formed so as to be heading toward the rear side of the casing 10. Thus, by disposing the antenna elements within the limited mounting space as far as possible from the touch sensor 13, the influence of the peripheral electrical wiring line of the touch sensor 13 on the antenna elements is able to be reduced.

Figure 6:
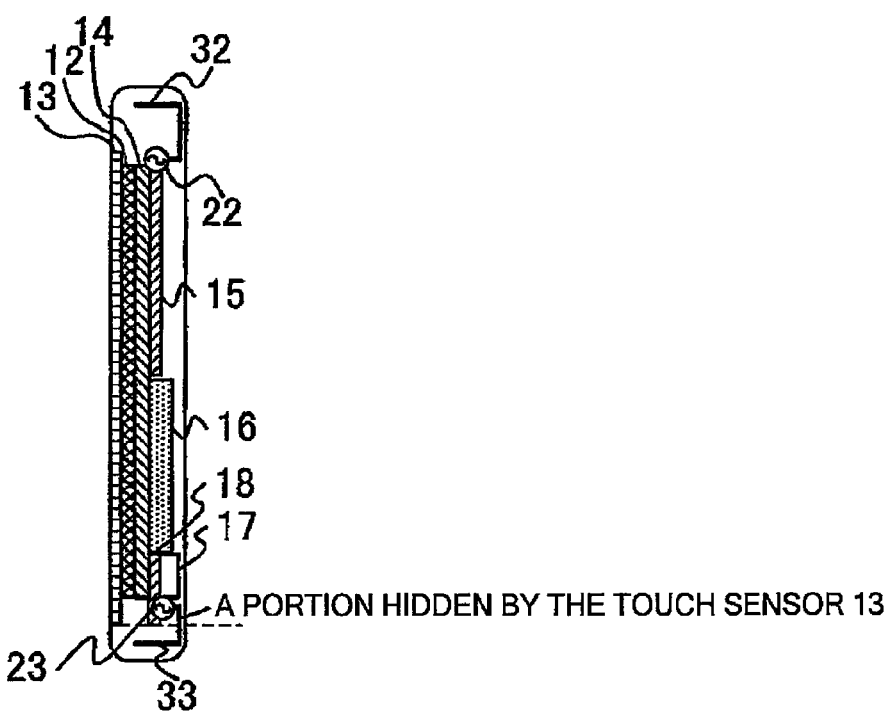
FIG. 6 is an exemplary side view illustrating a modification of the wireless device 1 in which the second substrate 18 shown in FIG. 5 is extended.

FIG. 6 is a side view illustrating a modification of the wireless device 1, in which the second substrate 18 shown in FIG. 5 is extended such that the lower position of the second substrate 18 shown in FIG. 5 corresponds with the lower position of the touch sensor 13 at a direction perpendicular to the paper. Similarly to FIG. 3 or FIG. 5, the left side corresponds to the front of the casing 10, and the right side corresponds to the rear side of the casing 10, respectively. For simplicity, description of elements shown in FIG. 6 similar to elements shown in FIG. 5 will be omitted.

In FIG. 6, a broken line proceeding from the lower end to the right side of the touch sensor 13 is represented. The portion of the third antenna element 33 located above the broken line is the portion hidden by the touch sensor 13 when viewed from the front of the casing 10, as shown in FIG. 6. As shown in FIG. 6, by extending the second substrate 18 in a downward direction, the second substrate 18 is arranged between the portion of the third antenna element 33 hidden by the touch sensor 13 and the touch sensor 13. Further, by mounting a conductive member (for example, a conductor pattern) to the second substrate 18, the conductive member is arranged between the portion of the third antenna element 33 hidden by the touch sensor 13 and the touch sensor 13.

If ground potential is applied to the conductive member, the isolation effect between the third antenna element 33 and the touch sensor 13 is able to be increased. In particular, if the radio-frequency current in the vicinity of the third feeding point 23 is relatively high, a further improved isolation effect is able to be obtained.

The first antenna element 31, the second antenna element 32 or the third antenna element 33 may be implemented by, for example, a folded monopole antenna or an inverted-F antenna, besides an open-ended monopole antenna. In addition, any other antennas may be used.

The first antenna element 31, the second antenna element 32 and the third antenna element 33 are mounted in the vicinity of the one short side of the rectangular casing 10. This is because if the area that the display 12 occupies is large, it is difficult to obtain the antenna mounting space in the vicinity of the long side of the rectangular due to the need for strength in the casing.

As shown in the first embodiment, a plurality of antenna elements (for example, the first antenna element 31 and the second antenna element 32) may be mounted in the vicinity of the one short side of the rectangle, and the one side and the other side of a plurality of antenna elements (for example, the first antenna element 31 and the third antenna element 33) may be mounted in the vicinity of the upper short end and lower short side of the rectangle, respectively.

In addition, according to the wireless device 1 of the first embodiment, as shown in FIG. 4, the first feeding point 21 and the second feeding point 22 are mounted in the vicinity of the center of the upper short end of the casing 10. According to such a configuration, when a user views the screen unit 12 with the short side of the wireless device 1 (a state that the wireless device 1 in FIG. 2 is rotated by 90 degrees counterclockwise) grasped by both hands, thereby overlapping the position of the first feeding point 21 and the second feeding point 22 with the position of the one hand (in this case, a left hand). Thus, the possibility that the performance of the antennas will deteriorate is able to be decreased. Furthermore, since a fitting rib for assembling the casing 10 is able to be formed far from the first feeding point 21 and the second feeding point 22, instances of breakage or bad contact regarding these feeding points is able to be reduced.

As shown in FIG. 4, any functional parts such as a camera 20 may be mounted between the first feeding point 21 and the second feeding point 22. Since space corresponding to the feeding points of the antenna can be formed so that the influence due to the close metal contained in the functional parts is less than the position of high electric field (for example, the ends of the antenna element, etc.), space between the two feeding points can be efficiently utilized.

For example, when the wireless device 1 has a function of receiving Digital Terrestrial Television Broadcasting (DTTB), the second antenna element 32 may be used as an antenna for DTTB reception. By disposing the second antenna element 32 in the left and upper part when viewed from the user, when a user views the screen unit 12 with the short side of the wireless device 1 grasped by both hands, the possibility of deterioration in reception performance due to the second antenna element 32 being hidden by the user's left hand is able to be decreased.

According to the first embodiment of the invention described above, in a wireless device where a touch panel occupies the majority of the area of the casing, deterioration in the performance of the antenna caused by the antenna element being hidden by the touch sensor is able to be suppressed.

Second Embodiment

Next, a second embodiment of the invention will be described with reference to FIGS. 7 to 12. For simplicity, description of configurations similar to the wireless device 1 related to the first embodiment shown in FIGS. 1 to 5 will be omitted. Each configuration of the wireless device 5 related to the second embodiment of the invention, other than the elements of the wireless device 1, will be described hereinafter.

Figure 7:
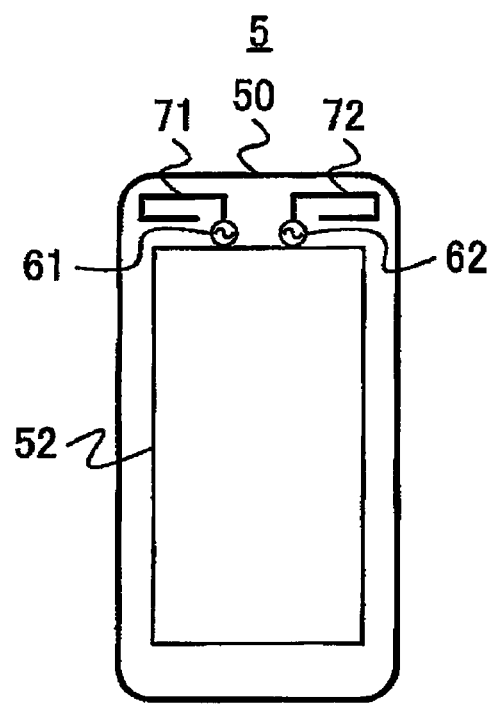
FIG. 7 is an exemplary front view illustrating a configuration of a wireless device related to a second embodiment of the invention.

FIG. 7 is a front view illustrating the main configurations of the wireless device 5 related to a second embodiment of the invention when viewed from the front of the paper as in FIG. 2. The wireless device 5 includes the display 52 in the front of the casing 50. For the wireless device 5, a first feeding point 61 and a second feeding point 62 are mounted at the upper part of the casing 50 in FIG. 7, and a first antenna element 71 and a second antenna element 72 respectively connected to the feeding points are built in the casing 50.

As shown in FIG. 7, the first feeding point 61 and the second feeding point 62 are mounted in the vicinity of the center of the upper short end of the casing 50. The open end of the first antenna element 71 is bent to a direction close to the first feeding point 61 and located in the vicinity of the center of the upper short side of the casing 50. The open end of the second antenna element 72 is bent to a direction close to the second feeding point 62 and located in the vicinity of the center of the upper short side of the casing 50.

Figure 8:
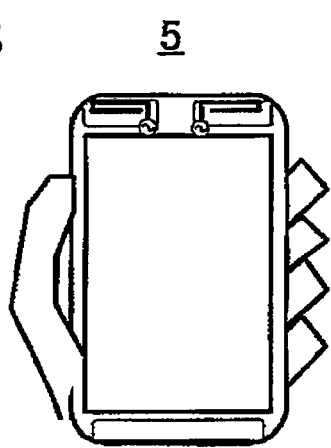
FIG. 8 is an exemplary diagram illustrating a state where the wireless device related to the second embodiment in the same direction shown in FIG. 7 is grasped by a left hand.

FIG. 8 is a diagram illustrating a state where the wireless device 5 in the same direction shown in FIG. 7 is grasped by a left hand. For simplicity, reference numerals for each element will be omitted. As shown in FIG. 8, according to the arrangement of the first feeding point 61, the second feeding point 62, and the shape of the first antenna element 71 and the second antenna element 72, the possibility that the feeding points of the respective antenna elements and the end portion where a voltage with a relatively high amplitude is distributed are covered by the left hand is able to be decreased.

Figure 9:
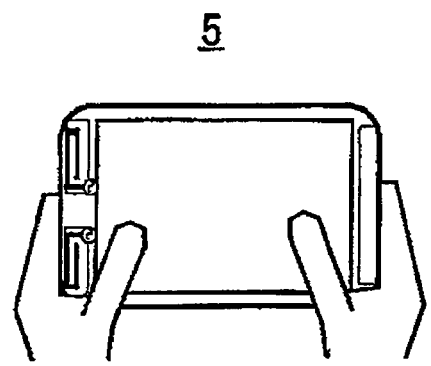
FIG. 9 is an exemplary diagram illustrating a state where the wireless device related to the second embodiment is rotated counterclockwise by 90 degrees from the state shown in FIG. 7 and grasped by both hands.

FIG. 9 is a diagram illustrating a state where the wireless device 5 is rotated counterclockwise by 90 degrees from the state shown in FIG. 7 and grasped by both hands. For simplicity, reference numerals for each element will be omitted. As shown in FIG. 9, according to the arrangement of the first feeding point 61, the second feeding point 62, and the shape of the first antenna element 71 and the second antenna element 72, the possibility that the feeding points of respective antenna elements and the end portion where a voltage with a relatively high amplitude is distributed are covered by the left hand is able to be decreased.

Figure 10:
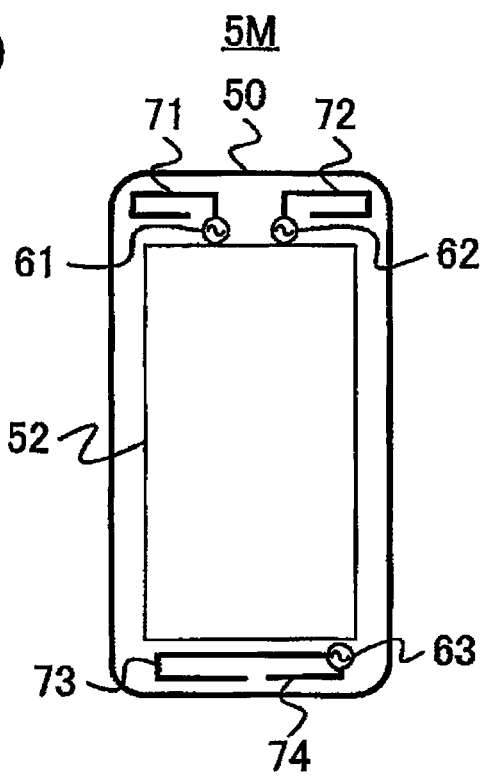
FIG. 10 is an exemplary front view illustrating a modification of the wireless device related to the second embodiment of the invention.

FIG. 10 is a front view illustrating a modification of the wireless device 5 as the main configurations of a wireless device 5M when viewed from the front of the paper as in the FIG. 7. In addition to the elements of the wireless device 5, the wireless device 5M further includes the third feeding point 63, the third antenna element 73 and the fourth antenna element 74. The third feeding point 63 is mounted at the right and lower part of the casing 50 in FIG. 10. The third antenna element 73 and the fourth antenna element 74 are connected to the third feeding point 63 and built in the casing 50. Other elements besides the elements described above are similar to elements shown in FIG. 7, for simplicity, description thereof will be omitted.

As shown in FIG. 10, the open end of the third antenna element 73 is bent to a direction close to the third feeding point 63 and located in the vicinity of the center of the lower short side of the casing 50. The open end of the fourth antenna element 74 is located in the vicinity of the center of the lower short side of the casing 50.

Figure 11:
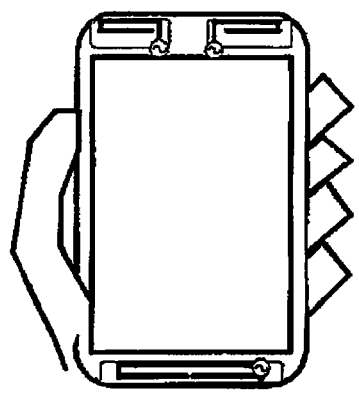
FIG. 11 is an exemplary diagram illustrating a state where the modification of the wireless device related to the second embodiment in the same direction shown in FIG. 10 is grasped by a left hand.

FIG. 11 is a diagram illustrating a state where the wireless device 5M in the same direction shown in FIG. 10 is grasped by a left hand. For simplicity, reference numerals for each element will be omitted. As shown in FIG. 11, according to the arrangement of the first feeding point 61, the second feeding point 62 and the third feeding point 63, and the shape of the first antenna element 71, the second antenna element 72, the third antenna element 73 and the fourth antenna element 74, the possibility that the feeding points of respective antenna elements and the end portion where a voltage with a relatively high amplitude is distributed are covered by the left hand is able to be decreased.

Figure 12:
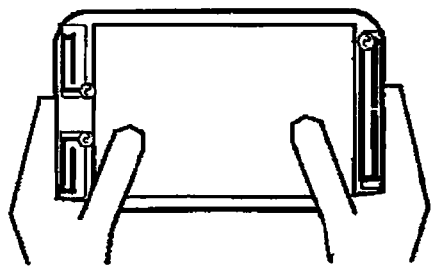
FIG. 12 is an exemplary diagram illustrating a state where the modification of the wireless device related to the second embodiment are rotated counterclockwise by 90 degrees from the state shown in FIG. 10 and grasped by both hands.

FIG. 12 is a diagram illustrating a state where the wireless device 5M is rotated counterclockwise by 90 degrees from the state shown in FIG. 10 and grasped by both hands. For simplicity, reference numerals for each element will be omitted. As shown in FIG. 12, according to the arrangement of the first feeding point 61, the second feeding point 62 and the third feeding point 63, and the shape of the first antenna element 71, the second antenna element 72, the third antenna element 73 and the fourth antenna element 74, the possibility that the feeding points of respective antenna elements and the end portion where a voltage with a relatively high amplitude is distributed are covered by the left or right hands is able to be decreased.

Figure 13:
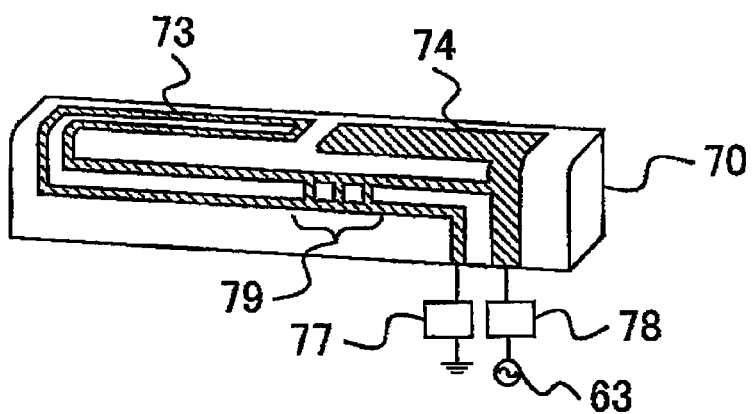
FIG. 13 is an exemplary diagram illustrating the configuration of an antenna element according to the modification of the wireless device related to the second embodiment.

FIG. 13 is a diagram illustrating each part of the third antenna element 73 and the fourth antenna element 74 shown in FIG. 10. In the example shown in FIG. 13, by insert-molding a plate to a surface of an antenna member 70 made of resin, the third antenna element 73 and the fourth antenna element 74 are formed (the molding technique for the antenna element is not limited to the above method, but may include any other molding methods). The third antenna element 73 is formed of a folded monopole antenna, and one end of the antenna element 73 opposite to the third feeding point 63 is grounded. The fourth antenna element 74 is formed of an open-ended monopole antenna having a relatively wide shape.

The power-supply terminal and the ground terminal of the third antenna element 73, as shown in FIG. 13, may be grounded and power-fed through matching circuits 77 and 78 having, for example, a reactance element, etc. By providing a suitable connection position 79 between a going line and a coming line in the third antenna element 73, impedance viewed from the third feeding point 63 can be adjusted.

As described above, by selecting the arrangement and the shape of an antenna element according to the second embodiment of the invention, even when a user grasps a wireless device in which a touch panel occupies the majority of the area of the casing, deterioration in the performance of the antenna caused by the hands can be suppressed.

In descriptions of the respective embodiments, configuration, shapes, connection manners and molding methods of a wireless device, a touch panel and an antenna, and shape and arrangement of other elements are exemplarily illustrated, and thus various modifications can be made without departing from the spirit or scope of the invention. For example, the casing of the wireless device is not limited to a single element; the invention is applicable to a wireless device having a configuration in which two or more casings are movably connected with each other.

What is claimed is:
1. A wireless device comprising:
a touch sensor;
a casing including a plurality of sides surrounding a face of the touch sensor, wherein the plurality of sides includes a first short side and a second short side opposing the first short side, and wherein the touch sensor is mounted to the casing;
a ground member;

a substrate in the casing; and
a first antenna element built in the casing and disposed closer to the first short side than the second short side;
wherein:
the first antenna element includes a first open terminal and a first power-supply terminal;
the first open terminal is located outside of the touch sensor in a direction perpendicular to a face of the touch sensor; and
a portion of a line between the first open terminal and the first power-supply terminal overlaps with the touch sensor in the direction perpendicular to the face of the touch sensor.

2. The wireless device of claim 1, wherein:
the first antenna element includes a first portion which is parallel to the first short side; and
the first portion is located outside of the touch sensor in the direction perpendicular to the face of the touch sensor.

3. The wireless device of claim 1, wherein the first power-supply terminal overlaps with the touch sensor in the direction perpendicular to the face of the touch sensor.

4. The wireless device of claim 1, wherein the ground member comprises a conductive member disposed between the first antenna element and the touch sensor.

5. The wireless device of claim 4,
wherein the first open terminal is located outside of the conductive member in the direction perpendicular to the face of the touch sensor.

6. The wireless device of claim 1, further comprising:
a second antenna element disposed closer to the second short side than the first short side;
wherein:
the second antenna element includes a second open terminal and a second power-supply terminal;
the second open terminal is located outside of the touch sensor in the direction perpendicular to the face of the touch sensor; and
a portion of a line between the second open terminal and the second power-supply terminal overlaps with the touch sensor in the direction perpendicular to the face of the touch sensor.

7. The wireless device of claim 6, wherein:
the substrate includes first and second radio-frequency circuits; and
the first antenna element connects to a first communication module and the second antenna element connects to a second communication module.

8. The wireless device of claim 6, further comprising:
a battery;
wherein the first antenna element is closer to the first short side than the battery and the second antenna element is closer to the second short side than the battery.

9. The wireless device of claim 6, wherein the second power-supply terminal overlaps with the touch sensor in the direction perpendicular to the face of the touch sensor.

10. The wireless device of claim 1, further comprising:
a second antenna element disposed closer to the first short side than the second short side;
wherein:
the second antenna element includes a second open terminal and a second power-supply terminal;
the second open terminal is located outside of the touch sensor in the direction perpendicular to the face of the touch sensor; and
a portion of a line between the second open terminal and the second power-supply terminal overlaps with the touch sensor in the direction perpendicular to the face of the touch sensor.

11. The wireless device of claim 10, further comprising:
a battery;
wherein the first and second antenna elements are closer to the first short side than the battery.

12. The wireless device of claim 10, further comprising a camera disposed between the first and second antenna elements.

13. The wireless device of claim 10, wherein the second power-supply terminal overlaps with the touch sensor in the direction perpendicular to the face of the touch sensor.

14. The wireless device of claim 10, further comprising:
a third antenna element disposed closer to the second short side than the first short side;
wherein:
the third antenna element includes a third open terminal and a third power-supply terminal;
the third open terminal is located outside of the touch sensor in the direction perpendicular to the face of the touch sensor; and
a portion of a line between the third open terminal and the third power-supply terminal overlaps with the touch sensor in the direction perpendicular to the face of the touch sensor.

15. The wireless device of claim 1, wherein the plurality of sides surround the face of the touch sensor when viewed from the direction perpendicular to the face of the touch sensor.

16. The wireless device of claim 1, wherein the touch sensor comprises electrical wires in a peripheral portion of the touch sensor.

17. The wireless device of claim 16, wherein the electrical wires are configured to transmit position information through the electrical wires, the information being detected by the touch sensor.

18. A wireless device comprising:
a touch sensor comprising electrical wires in a peripheral portion of the touch sensor;
a casing including a plurality of sides, wherein the plurality of sides surround a face of the touch sensor when viewed from a direction perpendicular to the face of the touch sensor, the plurality of sides includes a short side, and the touch sensor is mounted to the casing,
a ground member; and
a first antenna element located along the short side,
wherein:
the first antenna element includes a first portion parallel to the short side and a first power-supply terminal,
the first portion and the first power-supply terminal are electrically connected with each other,
the first portion is located outside of the touch sensor in a direction perpendicular to a face of the touch sensor, and
the first power-supply terminal overlaps with the touch sensor in the direction perpendicular to the face of the touch sensor.

19. The wireless device of claim 18, further comprising:
a conductive member between the first antenna element and the touch sensor in a direction perpendicular to the face of the touch sensor,
wherein:
the first portion is located outside of the conductive member in the direction perpendicular to the face of the touch sensor, and the first power-supply terminal overlaps with the conductive member in the direction perpendicular to the face of the touch sensor.

20. The wireless device of claim 18, wherein the electrical wires are configured to transmit position information through the electrical wires, the information being detected by the touch sensor.

* * * * *